Figure 1:
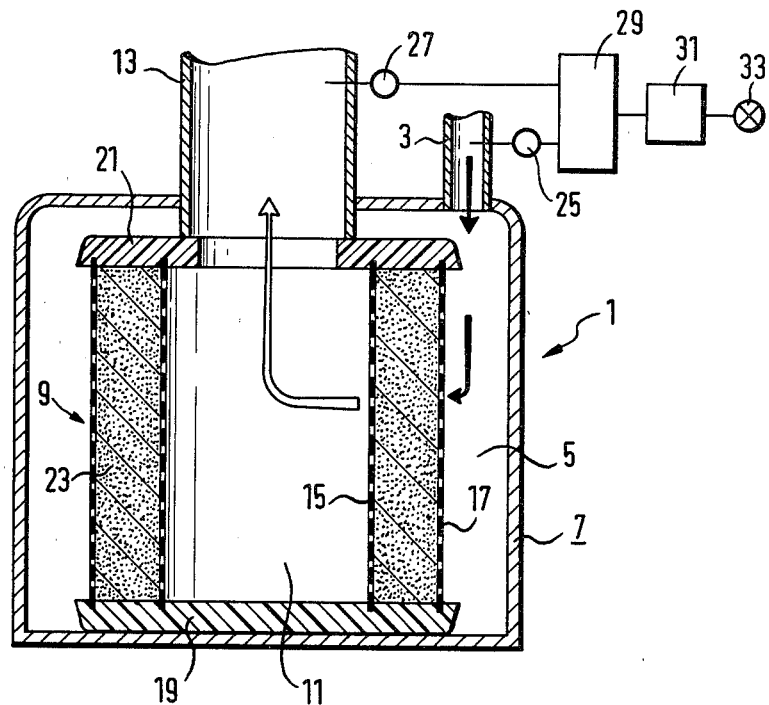

United States Patent [19]

Hengst et al.

[11] 4,332,679

[45] Jun. 1, 1982

[54] DEVICE FOR INDICATING THE DEGREE OF EXHAUSTION OF AN ADSORPTION FILTER

[75] Inventors: Bernd Hengst; Wolfgang Grosspietsch, both of Schweinfurt; Karl-Heinz Ognibeni, Dittelbrunn, all of Fed. Rep. of Germany

[73] Assignee: Fichtel & Sachs AG, Schweinfurt, Fed. Rep. of Germany

[21] Appl. No.: 226,158

[22] Filed: Jan. 19, 1981

[30] Foreign Application Priority Data

Jan. 18, 1980 [DE] Fed. Rep. of Germany ....... 3001675

[51] Int. Cl.³ ...................... B01D 15/00; B01D 53/30
[52] U.S. Cl. ........................................ 210/90; 55/270; 210/97; 210/266
[58] Field of Search ............... 210/662, 669, 806, 807, 210/97, 108, 111, 266, 275, 287, 314, 317, 318, 90, 434; 55/163, 270, 309, 312, 314, 316, 387, 479, 482, DIG. 34

[56] References Cited

U.S. PATENT DOCUMENTS

| | | | |
|---|---|---|---|
| 2,858,024 | 10/1958 | Babcock | 210/108 |
| 3,826,368 | 7/1974 | Walters | 210/108 |
| 3,985,648 | 10/1976 | Casolo | 210/669 |
| 4,026,792 | 5/1977 | Orth | 210/669 |
| 4,197,098 | 4/1980 | Stiehl et al. | 55/270 |

*Primary Examiner*—Ivars C. Cintins
*Attorney, Agent, or Firm*—Toren, McGeady and Stanger

[57] ABSTRACT

A filtering apparatus for indicating the degree of exhaustion of an adsorption filter which includes a mechanical filter and a pressure meter for detecting the difference in pressure between a point downstream and a point upstream of the mechanical filter to provide an indication of the degree of exhaustion of the adsorption filter. The mechanical filter may be an internal type filter or a surface filter and it may be either series-connected or connected in shunt with the flow path of the adsorption filter.

9 Claims, 3 Drawing Figures

DEVICE FOR INDICATING THE DEGREE OF EXHAUSTION OF AN ADSORPTION FILTER

Adsorption filters are chemically acting filters by means of which liquid or gaseous substances are filtered out from a fluid to be purified. As a rule the operator of the filter, the non-expert operator in particular, cannot see whether the chemical effect of the filter is lessening.

It is an object of the invention to provide a constructively simple device for indicating the degree of exhaustion of an adsorption filter.

The object is accomplished by a mechanical filter series-connected to or in shunt with the flow path of the adsorption filter and by a pressure meter detecting the difference between the pressure in the flow path before the mechanical filter and the pressure in the flow path behind this filter. As mechanical filter, preferably an internal-type filter (depth filter), i.e. a filter filtering in the interior of its pores, or a surface filter is provided.

The invention starts out from the assumption that on the time average the concentration of the ballast and dirty material contained in the fluid to be purified is about constant. The pressure meter measures the degree of clogging of this filter by means of the pressure difference before and behind the mechanical filter. The degree of clogging is indicative of the amount of liquid or gas purified by the adsorption filter and thus indicative of the degree of exhaustion of the adsorption filter. By proper dimensioning, particularly of the size, pore width and thickness of the filter material of the mechanical filter the degree of clogging of this filter can be so adjusted that a predetermined difference pressure is reached when the adsorption filter is exhausted. Furthermore the pressure meter can be calibrated according to the degree of exhaustion of the adsorption filter. In any case the mechanical filter should be so designed that it produces a difference pressure within an easily measurable pressure range when the adsorption filter is exhausted.

In a preferred embodiment the mechanical filter is provided by the carrier material of the adsorption filter and consists particularly of a powdery or granular solid material. By suitable selection of said carrier material, grain size and packing density of the adsorption filter a difference pressure between the input and output of the adsorption filter can also be produced, which is easy to detect by means of measuring technique when the adsorption filter is exhausted. If the mechanical filter is not formed by the carrier material of the adsorption filter, it can also be formed by at least one wall of the adsorption filter, which is either porous or has a plurality of screen openings.

In the afore-explained embodiments the mechanical filter in combination with the adsorption filter forms a constructional unit wherein the pressure meter preferably measures the pressure in the flow path before and behind the constructional unit. In another useful embodiment the mechanical filter together with the pressure detectors of the pressure meter forms a constructional unit separate from the adsorption filter, which can be separately incorporated into a pipeline for example, leading to the adsorption filter.

In order to keep the maintainance costs as low as possible the mechanical filter can preferably be flushed back.

The invention is applicable in adsorption filters for gaseous as well as for liquid media. The invention is preferably used in adsorption filters for drinking water purification.

Figure 2:
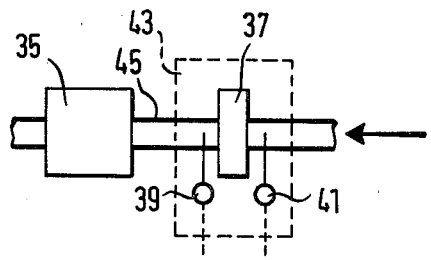
Figure 3:
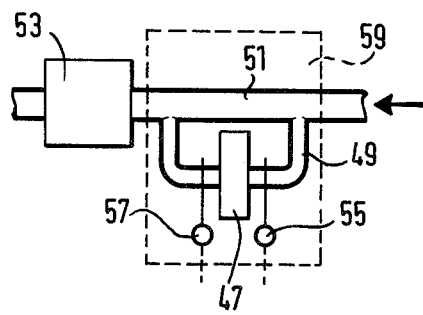

In the following embodiments of the invention illustrated by drawings are explained:

FIG. 1 is a schematic diagram of a first embodiment of a device for indicating the degree of exhaustion of an adsorption filter FIGS. 2 and 3 illustrate further embodiments of devices for indicating the degree of exhaustion of an adsorption filter FIG. 1 shows a schematic cross section of an adsorption filter 1 for purifying drinking water entering an annular chamber 5 of a housing 7 through an inlet pipe 3. The housing 7 contains an essentially tube-cylindrical, replaceable filter insert 9, the interior 11 of which is connected to an outlet pipe 13 for purified drinking water. The filter insert 9 comprises two porous or screenlike, tube-cylindrical walls 15, 17 forming an annular space 23 between each other closed by cover plates 19, 21 and filled with adsorption filter material. The cover plates 19, 21 seal the chamber 5 against the interior 11.

The adsorption filter material contained in the annular space 23 consists of active carbon with or without silver and/or ion exchanger resins of any kind and/or inorganic adsorption substances as conventional in drinking water purification.

The adsorption filter material purifies the drinking water from impurities such as organic, adsorbing molecules, particularly odorous and flavorous substances as well as adsorbing inorganic molecules as e.g. chlorine and chlorine-oxygen compounds and/or ozone. The adsorption filter material has a powdery or granular structure. Its grain size and packing density is chosen so that it is at the same time effective as internal-type filter (depth filter) whose degree of clogging produces a pressure difference between the chamber 5 and the interior 11 easily detectable by measuring techniques when the adsorption filter material is chemically exhausted. The pressure difference is detected by means of electric pressure detectors 25, 27 and by a subtracting stage 29 connected to said detectors. A threshold stage 31 connected to the subtracting stage 29 triggers an indicator means 33, as e.g. a warning lamp when the pressure difference exceeds a given threshold value determined by the exhaustion of the adsorption filter 1. In FIG. 1 the pressure detectors 25, 27 are arranged adjacent to the housing 1 in the inlet pipe 3 and the outlet pipe 13 respectively. The pressure detectors 25, 27 can also measure the pressure within the housing 1. Instead of two electric pressure detectors the output signals of which are subtracted from one another, also mechanical difference pressure means, e.g. in the form of membranes can be provided whose deflection depending upon the difference pressure is detected.

If the adsorption filter material within the annular space 23 does not produce a measurable pressure difference upon exhaustion, the walls 15 and/or 17 on their part can be designed as internal-type filter (depth filter) or surface filter by suitable selection of the wall materials. The walls 15, 17 can consist of filter fleece or porous material for example, the surface dimensions, pore width and thickness of which are suitably selected.

FIG. 2 shows another embodiment wherein a separate surface filter or internal-type filter 37 arranged in the flow path before an adsorption filter 35 together with pressure detectors 39, 41 of the pressure meter, is combined to a constructional unit 43. The internal-type filter or surface filter 37 is series-connected to the inlet pipe 45 of the adsorption filter 35 and mechanically purifies the entire fluid supplied to the adsorption filter 35 for chemical purification.

FIG. 3 illustrates a further embodiment wherein an internal-type filter or surface filter 47 is connected to a shunt pipe 49 shunting an inlet pipe 51 of an adsorption filter 53. In the flow path before and behind the internal-type filter or surface filter 47 pressure detectors 55, 57 of the pressure meter are arranged in the shunt pipe 49. In this embodiment, the internal-type filter or surface filter 47 together with the pressure detectors 55, 57, the shunt pipe 49 and a section of the inlet pipe 51 forms a constructional unit 59 separate from the adsorption filter 53. The embodiments according to FIGS. 2 and 3 can be provided with pressure meters similar to that of FIG. 1. In all the embodiments also measuring devices continuously indicating the amount of clogging can be employed instead of an indicator means merely indicating the exhaustion of the adsorption filter occurred.

We claim:

1. A filtering apparatus for detecting the degree of exhaustion of an adsorption filter comprising mechanical filter means arranged in flow communication with said adsorption filter, pressure sensing means for sensing fluid pressure proximate said mechanical filter means both upstream and downstream thereof, and means for detecting the difference between fluid pressure sensed upstream and downstream of said mechanical filter means to provide an indication of the degree of exhaustion of said adsorption filter based upon said fluid pressure difference, said mechanical filter means being connected in shunt with the flow path of said adsorption filter.

2. Apparatus according to claim 1 wherein said mechanical filter comprises one of an internal type filter and surface filter.

3. Apparatus according to claim 1 wherein said mechanical filter means is formed of solid structural material of the adsorption filter.

4. Apparatus according to claim 3 wherein said solid structural material comprises powdery or granular filter material.

5. Apparatus according to claim 1 wherein said adsorption filter is composed of filter material bounded by wall means and wherein said mechanical filter means is formed of said wall means of said adsorption filter.

6. Apparatus according to claim 5 wherein said wall means are formed of porous material.

7. Apparatus according to claim 5 wherein said wall means are formed with a plurality of openings.

8. Apparatus according to claim 1 wherein said mechanical filter means and said pressure sensing means are formed as an individual structural unit separate from said adsorption filter.

9. Apparatus according to claim 1 wherein said mechanical filter means is adapted to be back flushed.

* * * * *